Sept. 13, 1938.  D. S. KENNEDY  2,130,277
GIRDLE FOR TWIN TIRED WHEELS
Filed Nov. 24, 1937  2 Sheets-Sheet 1
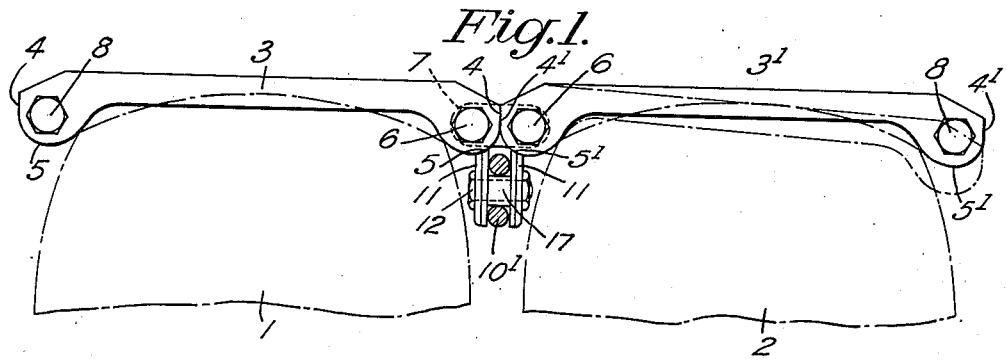
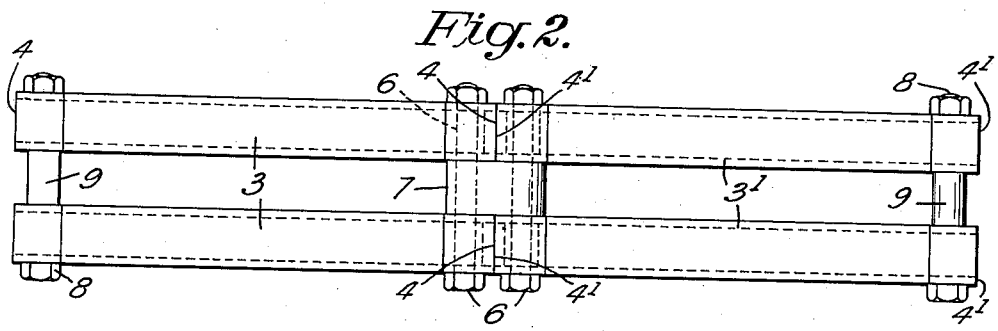
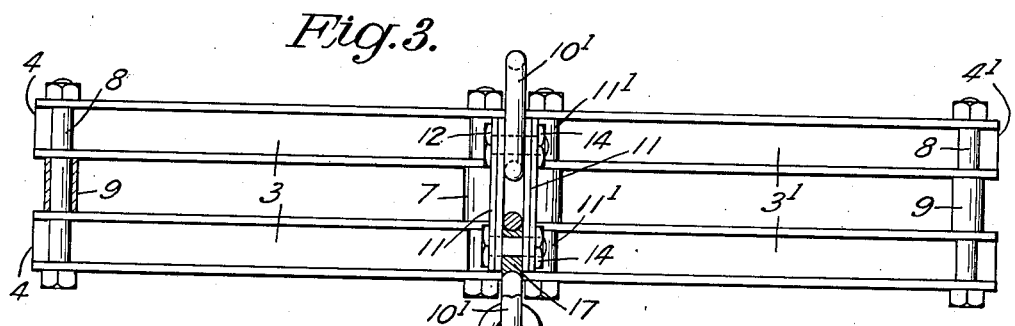
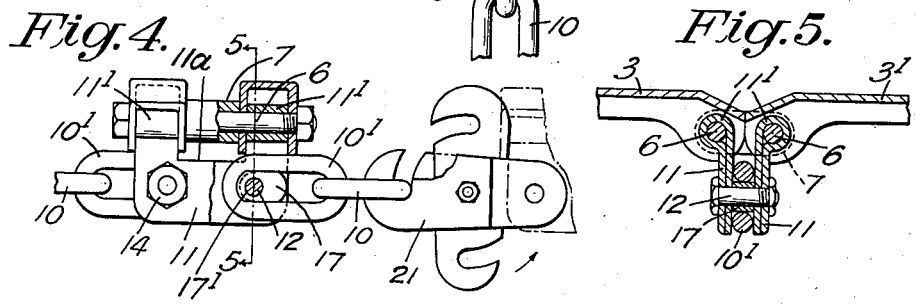
INVENTOR,
Donald Stuart Kennedy,
BY
ATTORNEY Sept. 13, 1938.     D. S. KENNEDY     2,130,277
GIRDLE FOR TWIN-TIRED WHEELS
Filed Nov. 24, 1937      2 Sheets-Sheet 2
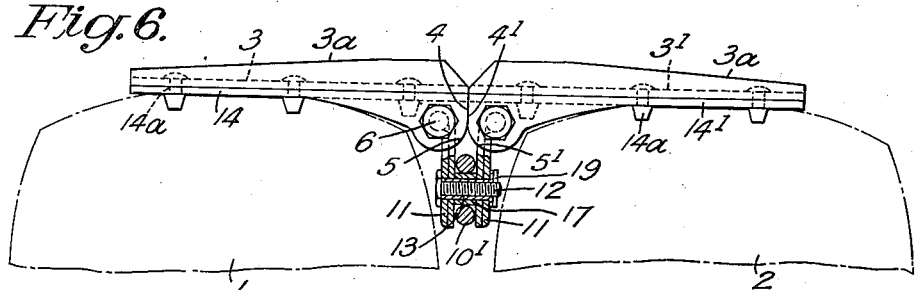
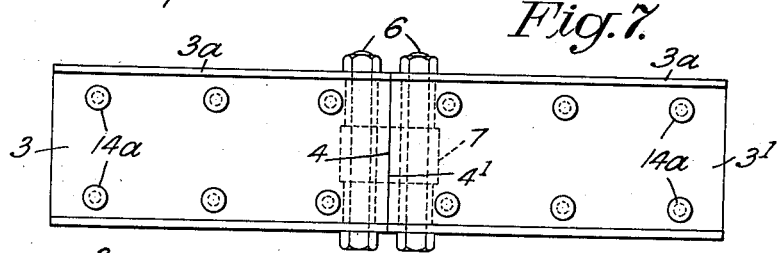
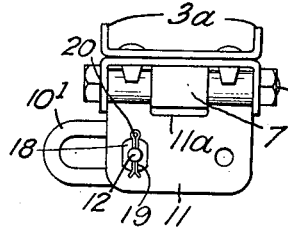
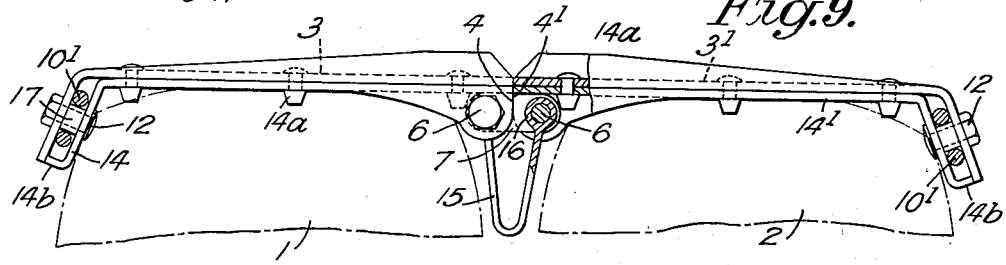
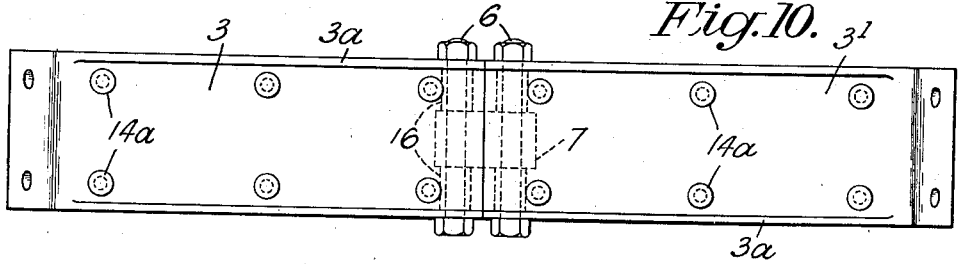
INVENTOR,
Donald Stuart Kennedy,
ATTORNEY.

Patented Sept. 13, 1938

2,130,277

UNITED STATES PATENT OFFICE 2,130,277

GIRDLE FOR TWIN-TIRED WHEELS

Donald Stuart Kennedy, Longparish, England

Application November 24, 1937, Serial No. 176,366
In Great Britain December 3, 1936

8 Claims. (Cl. 152—220)

This invention relates to non-skid chains for road vehicles and more particularly to shoe-fitted chains of the girdle type suitable for twin-tired wheels.

In view of the tendency to employ pneumatic tires of large section (a tire of 9 inches nominal section being now not unusual) and the consequent great transverse width of the shoe, it is important to provide against tilting or similar displacement of the shoe, while allowing for the quick assembly or uncoupling of the connecting chain links, and a guard against undue chafing or wear of the tires.

The present invention has for object to provide a girdle designed to meet those requirements.

According to the present invention, I form each transverse shoe in lateral halves which abut along or near to the central plane of the twin-tired wheel, these halves being pivoted or coupled together in such a manner that either half-shoe can move inwardly towards the axis of the wheel, but as regards movement in the other direction, must remain alined with the associated half-shoe, outward movement being prevented by means carried by the facing ends of the shoe halves.

The shoe-halves are preferably pivoted on parallel spindles coupled together by one or more shackle members lying in the same radial plane as the shoe.

Adjacent shoes are connected together by flexible chain links which may be arranged in the central plane of the wheel between the peripheries of the twin tires (or near thereto) and secured to a tongue, flap or bridge piece on the inward face of the shoe, or may be arranged to engage the sides or edges of the shoes.

The invention is hereafter described with reference to the annexed drawings, in which:—

Fig. 1 is an elevation of a first form of construction. Fig. 2 is a plan view of the top of Fig. 1, Fig. 3 is a plan view of the underside of Fig. 1 and Fig. 4 is a side view, part section, of a shoe as shown in Fig. 1. Fig. 5 is a sectional view on line 5—5 of Fig. 4.

Fig. 6 is an elevation of another form of construction, Fig. 7 being a plan view thereof and Fig. 8 is a side view of the shoe shown in Fig. 6.

Figs. 9 and 10 relate to a third form of construction and correspond with Figs. 6 and 7, except that the connecting links of Fig. 9 are not shown in Fig. 10.

In these drawings, the twin tires are indicated by 1 and 2, the halves 3, $3^1$ of the shoe extending approximately across the tread portions of said tires.

The halves 3, $3^1$ of the shoe are pivoted or coupled together in such a manner that whilst each half is free to move inwardly towards the axis of the wheel on which the tires 1 and 2 are mounted, movement of either half 3 or $3^1$ in the opposite direction, viz. outwardly in relation to the other half, is prevented by reason of square or flat faces 4, $4^1$ formed upon the respective shoe-halves each said square face on one half shoe being adapted to abut against the flat or square face on the other half-shoe. In order that either half may be free to move inwardly, i. e. towards the tire as when the girdle-fitted wheel rides over an obstacle, the shoe-halves are provided near the abutting square faces with rounded portions 5 and $5^1$. In this inward movement of the shoe-half, the latter embeds itself to some small extent in the tread of the pneumatic tire, as shown in chain lines on the right-hand half of Fig. 1. These rounded portions 5 and $5^1$ are concentric with the pivots of the two parts of the shoe.

The halves 3, $3^1$ of each shoe are in Figs. 1, 2 and 3, pivoted on parallel spindles 6, 6 and are each made of a pair of parallel channel shaped sections. The facing ends of the halves 3, $3^1$ are provided with the squared abutting portions 4, $4^1$ which normally are in contact and so prevent outwards movement of either shoe-half relatively to the other half. The squared ends 4, $4^1$ thus normally make contact which limits the movement of the pivoted shoe-half to a radially inwards direction. These abutting faces 4, $4^1$ are situated along or near to the central plane of the twin-tired wheel. The parallel spindles 6, 6 are shown coupled and also spaced apart by a shackle member 7, the ends of which are threaded upon the spindles 6, 6 and also arranged, see Fig. 2, between the channel sections of the respective halves of the shoe. This shackle member also maintains the spindles 6, 6 parallel and spaces them apart.

The channel sections may be arched or curved at their ends, as shown in Fig. 1, to conform approximately with the corners of the tire tread, and to help to locate the shoe upon the tires. At their outer ends, the sections of the halves 3, $3^1$ of each shoe are shown connected together by bolts 8, 8 with spacing sleeves 9, 9 on the bolts between the channel sections.

Adjacent shoes in this arrangement are connected together by lengths of flexible chain links 10, 10, the end link $10^1$ of each fore and aft length being secured between flaps 11, 11 which are mounted on the pivotal spindles 6, 6 of the shoe-halves and extend towards the center of the wheel between the twin tires. Each end link $10^1$ is secured in position between the flaps 11, 11 by a transverse bolt 12 passing through the flaps 11, 11 and end chain link 10¹. This bolt 12 may be fitted with a sleeve 13, as hereafter described.

The flaps 11, 11 serve to maintain the shoe in position upon the twin tires.

Instead of two parallel channel-section members for each half-shoe, I may employ four or other plural number, such members being spaced apart by sleeve washers or distance pieces 9, 9, and more than one shackle member 7 may be provided to couple the bolts 6, 6 together.

In the arrangement of Figs. 6, 7 and 8, the halves 3, 3¹ of the shoe may be constructed each from a single channel-section member with outwardly projecting ribs 3a arranged fore and aft and extending from end to end of the half-shoe; these shoe members are flat or straight on the outer, operative face and are each shown provided with an inner plate 14, 14¹ riveted at 14a to the outer one 3, 3¹. The halves are provided with the squared ends or abutting faces 4, 4¹ to prevent outwards movement of one half 3 or 3¹ relatively to the other, and also provided with curved portions 5, 5¹ allowing each half to move inwardly of the wheel and independently of the other. The pivotal spindles or bolts 6, 6 extending from front to rear of the shoe are again spaced apart by a shackle member 7 and likewise carry flaps 11, 11 hinged on said spindles or bolts 6, 6. The end links 10¹ of the flexible chain links 10, 10 are secured between the inwardly directed flaps 11, 11 by means of transverse bolts 12 passing through the chain links 10¹, as in the previous example. The bolt is easily withdrawn from the flaps when the chain link is to be detached from the flap. In this embodiment of the invention, the halves 3, 3¹ of the shoes are flat or straight upon their outer faces but the ribs 3a at the front and rear of the shoe-half are inclined so as to be of greater height adjacent to the plane of the pivot 6 and then sharply angled downwardly to the squared end or flat face 4 or 4¹ which abuts against the corresponding squared end or flat face of the associated half of the shoe.

The bolt 12 is shown in Fig. 6 provided with a sleeve nut, the sleeve 13 extending through the flap 11 to the inner face of the bolt-head. This sleeve 13 is shown integral with a nut 18 which is slotted as at 19 to allow a split pin 20 to pass through a hole in the bolt. This transverse bolt enables the chain to be quickly attached to or detached from the flaps 11, 11.

The flaps employed in the arrangements illustrated in Figs. 1, 2, 6 and 7 may each be made of sheet metal incorporating one or more looped portions 11¹, 11¹ to be traversed by the spindles 6, 6, said flaps having parallel juxtaposed portions traversed by the bolts 12, 12 and recessed at 11a to receive the aforesaid shackle member 7. The looped portions 11¹ extend into the channel section members. The pivotal spindles 6, 6 for the halves of the shoe preferably consist of nut-fitted bolts, as shown in the drawings.

In a modified form of the invention, see Figs. 9 and 10, the shoes are connected by chains at their lateral edges. The halves 3, 3¹ of the shoe are pivotally mounted as in previous examples on parallel bolts 6, 6 and are fitted with abutting faces 4, 4¹ which prevent outward movement of one shoe-half in relation to the other shoe-half, whilst permitting either half to yield inwardly upon the tread of the tire as when passing over a brick for example, and the pivotal bolts are held together by a shackle member 7. The connecting chains between adjacent shoes, however, are in this example secured upon the outer edges of the shoe-halves which are curved to conform approximately to the corner of the tire tread. The end links 10¹ are secured in pockets or loops formed by flared ends of the outer plate 3, 3¹ of the shoe and by flared ends of the inner plates 14, 14¹ of the shoe; this inner plate may have an out-turned flange 14b if desired, and the end chain-links 10¹ is secured by a nut-fitted bolt 12, carrying a sleeve 13 if desired, which passes through the pocket or loop formed by the outer and inner plates and the chain link 10¹ in between.

A tongue 15 is also provided to extend between the twin tires, to facilitate the application of the girdle to the wheel and the maintenance of the girdle in position. Such tongue is formed as a V-shaped or U-shaped member having extremital loops one of which is shown at 16, to engage the bolts 6, 6 on which the shoe halves are pivoted.

The inner and outer plates of the shoe-half are riveted together by rivets 14a and the outer plate is preferably provided at its leading and trailing edges with outwardly projecting ribs 3a, inclined outwardly from the outer edges of the shoe and provided with an angular or cut away portion adjacent to the abutting faces 4, 4¹ of the shoe halves.

It will be noted that in all examples the abutting faces 4, 4¹ of the shoe-halves prevent either one of the said halves from independently flying outwards under the action of centrifugal force when the girdle-fitted wheel is travelling at high speed.

If desired, the shoe-halves 3 and 3¹ may be provided at each of their ends with the faces 4, 4¹ shaped to abut against a corresponding face on another similar shoe-half, the manufacture and assembly being thereby facilitated. Each shoe half is thus symmetrical at its inner and its outer ends. Such arrangement is shown in Figs. 1 and 2.

I wish it to be understood that the links 10, 10 employed to connect the adjacent shoes together are chain links and not rigid linkages or rigid link members. The extremital link 10¹ of each length of flexible chain 10, 10 is traversed by a bolt 12 which also passes through flaps 11, 11 secured respectively to each of the pivotal bolts 6, 6 for the shoe halves (Figs. 1–8), or through the inner and outer walls of loops formed upon the outer inturned edges of the shoe-halves or shoe sections (Figs. 9–10).

In connection with the end links 10¹ so secured in position, I may employ eccentric distance pieces 17 (see Fig. 4) of the known kind in order to take up stretch and to adjust the effective length of chain. The distance piece 17 is bored with a hole 17¹ for the bolt 12 which hole is nearer one end than the other. By reversing the distance piece in the loop 10¹ the effective length of the chain is altered. The coupling device shown at 21 in Fig. 4 is well adapted to secure the free ends of the chain 10.

What I claim is:—

1. In a non-skid girdle for a twin-tired road vehicle wheel, a shoe adapted to be set transversely of the tires and connected by chains with adjacent shoes, said shoe being formed in halves which abut near the central plane of the twin-tired wheel, said halves being pivotally mounted and coupled together to allow movement of either half towards the tire, the abutting halves of said shoe being provided with means carried by the facing ends of the shoe halves to prevent movement away from the tire of either half-shoe in relation to the other.

2. A non-skid girdle for a twin-tired vehicle wheel, comprising a shoe adapted to be set across the twin tires, flexible means for connecting said shoe to adjacent shoes, said shoe being made in lateral halves abutting in the central plane of the wheel, said halves being coupled together, adapted to move radially inwards of the wheel and provided with angular faces at their abutting ends which by contact prevent either half-shoe from moving outwardly in relation to the other half shoe.

3. A non-skid girdle of the character described comprising a shoe formed in halves, a spindle for each half, a shackle member coupling said spindles together, said half-shoes abutting one another in approximately the central plane of the wheel, flexible means for connecting said shoe to adjacent shoes in the girdle, and square faces upon the abutting ends of the shoe-halves, said square faces normally making contact with one another to prevent outward movement of either half shoe in relation to the other.

4. In a non-skid girdle for a twin-tired road-vehicle wheel, a shoe formed in halves, a pivotal spindle for each half, said spindles laying fore and aft of said shoe, and a shackle member engaging said spindles and maintaining them parallel, the facing edges of said halves being each shaped with a rounded portion concentric with the respective spindle to permit inwards radial movement of said half and also provided with squared abutting portions to make contact normally one with the other and prevent outward movement radial of either half shoe in relation to the other.

5. In a non-skid girdle for a twin-tired road vehicle wheel, a shoe for location across the twin tires and formed in lateral halves, a pivotal bolt for each half, said bolts lying fore and aft of said shoe and a shackle member coupling said bolts together, each said half being formed of a plurality of channel shaped sections, the sections of each half being held together at their outer ends, the sections of each half shoe at their facing ends having abutting portions preventing outwards movement of each half shoe in relation to the other half shoe, the outer ends of said channel sections being provided with extremities which are symmetrical with the inner extremities of said channel sections.

6. In a non-skid girdle for a twin-tired road vehicle wheel, a shoe adapted to be set across the twin tires and formed in lateral halves, said halves being mounted on nut-fitted pivotal bolts lying fore and aft of the shoe, flat abutting portions on the facing ends of said halves adapted to make contact one with the other, a coupling member between said bolts to maintain them parallel, flap members extending inwardly of the wheel between the treads of said tires, said flap members including loops engaging said pivotal bolts, and a chain link secured between said flap members by a bolt which passes through said flap members and the interposed chain link.

7. In a non-skid girdle for a twin-tired road vehicle wheel, a shoe adapted to be set across the twin tires and formed in lateral halves, said halves being mounted on nut-fitted pivotal bolts lying fore and aft of the shoe, said halves being each formed of a plurality of channel shaped sections secured together at their inner ends by the aforesaid pivotal bolts and secured at their outer ends by connecting bolts, a coupling member between said pivotal bolts to maintain them parallel, flap members extending inwardly of the wheel between said tire treads, said flap members having loops entering the channel members and engaging said pivotal bolts, and squared ends to said channel shaped sections adapted to make contact one with the other to prevent outward movement of either half shoe in relation to the other.

8. In a girdle for a twin-tired wheel, a shoe formed in lateral halves, said halves bearing each on one of said tires, spindles carried by said halves, said spindles being parallel and lying fore and aft of the shoe, a shackle member engaging each of said spindles and allowing pivotal movement of either half-shoe towards its tire, and a V-shaped member having looped extremities to engage said spindles, said V-shaped member extending towards the axis of the wheel, the facing edges of said lateral half-shoes being provided with abutting ends normally in contact one with the other and preventing outward movement of either half-shoe away from its tire and in relation to the other.

DONALD STUART KENNEDY.